L. ANGELO.
ANTISKID TREAD.
APPLICATION FILED MAR. 17, 1921.
1,399,179.
Patented Dec. 6, 1921.
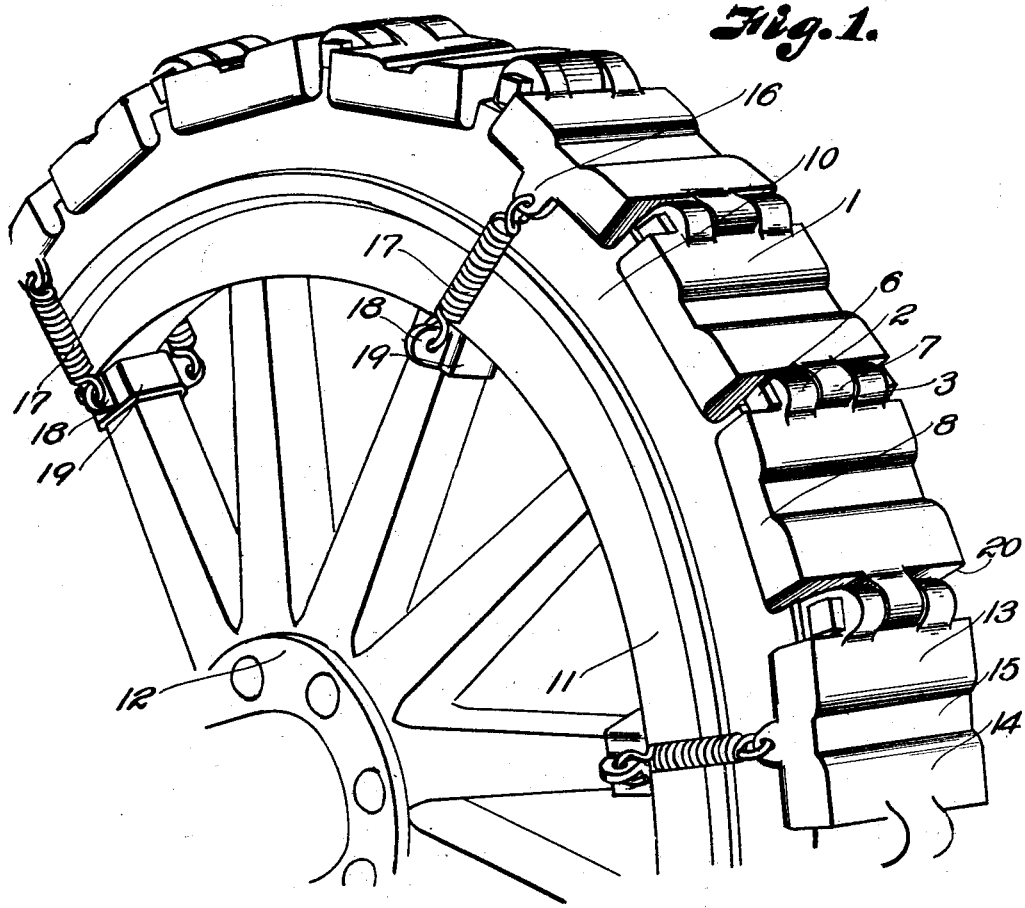
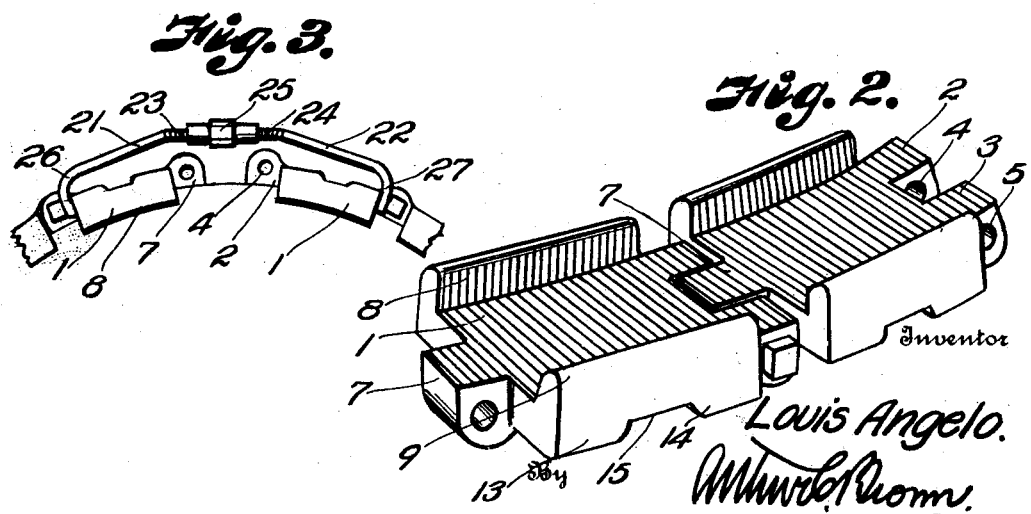
Inventor
Louis Angelo.
Attorney

UNITED STATES PATENT OFFICE.

LOUIS ANGELO, OF KANSAS CITY, MISSOURI.

ANTISKID-TREAD.

1,399,179. Specification of Letters Patent. Patented Dec. 6, 1921.

Application filed March 17, 1921. Serial No. 453,017.

*To all whom it may concern:*

Be it known that I, LOUIS ANGELO, a citizen of the United States, residing at Kansas City, in the county of Jackson and State of Missouri, have invented certain new and useful Improvements in Antiskid-Treads; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to anti-skid treads for tires and the primary object is to provide a tread consisting of a plurality of blocks linked together to be connected about the perimeter of the wheel so as to form a supplemental tread adapted to afford efficient traction for the wheel to which it is attached.

The tread surfaces are so constructed that they will efficiently grip the ground or road bed and prevent skidding of the wheel, there being wear flanges on the blocks to overlap the tire so as to protect the tire against pinching or scuffing against the curve.

An important feature of the invention is to provide means whereby the blocks may be so connected together that no friction will be set up by rubbing of adjacent ends so as to heat the blocks and cause the rubber in the tire to soften or melt.

Tire treads have been provided heretofore in which the blocks when applied have rubbing actions one against the other. The incessant rubbing, due to the travel of the wheel over the road bed, soon sets up enough friction to heat the blocks with the result that the rubber in the tire is affected.

According to my invention the blocks are spaced apart so this frictional heating cannot take place.

The novel construction of the tread will be apparent by reference to the following description in connection with the accompanying drawings, in which—

Figure 1 is a fragmentary, perspective view of a vehicle wheel to which my invention is applied.

Fig. 2 is a detail perspective view of two alining, coöperating, connected tread blocks, and Fig. 3 is a side elevational view of two end blocks and a connecting device for drawing them together.

The tread is shown as consisting of a plurality of blocks 1, each of which is provided at one end with outwardly extending, parallel, complementary lugs or projections 2 and 3, having alining openings 4 and 5 for the reception of a pintle or fastening device shown as a bolt 6. At the end of each block 1, opposite to the lugs 2 and 3, is a centrally located, outwardly projecting lug 7, adapted to be received between the lugs 2 and 3 of a complementary block and secured thereto by the bolts 6, as will be apparent by reference to Fig. 2.

Each substantially rectangular block 1 is provided with inwardly extending, parallel guard flanges 8 and 9, which are adapted to overlie the opposite sides of the tire 10, carried by the felly 11 of the wheel 12.

The inner face of each block 1 is smooth to receive the tread of the tire 10 and the outer face of each block is provided with horizontally disposed, spaced tread ribs or portions 13 and 14, which are spaced apart by the grooves 15 so that an efficient purchase for the blocks on the ground may be provided.

Certain of the blocks may have end lugs or projections 16, engaged by springs 17, connected to the lugs 18 on the spoke-engaging sleeves 19, the tension of the springs 17 being sufficient to maintain the tread fast to the periphery of the wheel.

By reference to the drawings it will be apparent that the outstanding lugs 7, which are received between the complementary lugs 2 and 3, act as spacing lugs to maintain spaces 20 between the respective blocks, thereby eliminating liability of the ends of the blocks rubbing one against the other and setting up frictional heat to affect the tire. This is an important feature of my invention.

The meeting ends of the tread may be drawn together by a connecting device consisting of the two hook-shaped members 21 and 22 threaded on the inner ends as at 23 and 24, the threaded ends being engaged by a turnbuckle 25, which may be located to draw the hooked ends 26 and 27 one toward the other so that the lugs of the adjacent end blocks can be brought into alinement to insert the bolt and thereby complete the ring or band.

It is apparent that the anti-skid removable tread can be easily applied and as easily detached, that it will provide efficient traction for the wheel, and that liability of the blocks being heated due to friction when in use will be eliminated.

What I claim and desire to secure by Letters-Patent is:

As a new article of manufacture, an anti-skid chain link comprising a rectangular block having a rectangular flat face with a transverse groove and having straight tire-engaging flanges on its side edges and provided with a recess at one end and a tongue at the other, the recessed portion and the tongue projecting beyond the ends of the flanges of the block, the link consisting of cast metal, all the parts of which are integral.

In testimony whereof I affix my signature.

LOUIS ANGELO.